Nov. 27, 1962  W. W. GARY  3,065,595
CATALYTIC CONVERTER SYSTEM FOR INTERNAL COMBUSTION ENGINES
Filed May 9, 1960  6 Sheets-Sheet 1
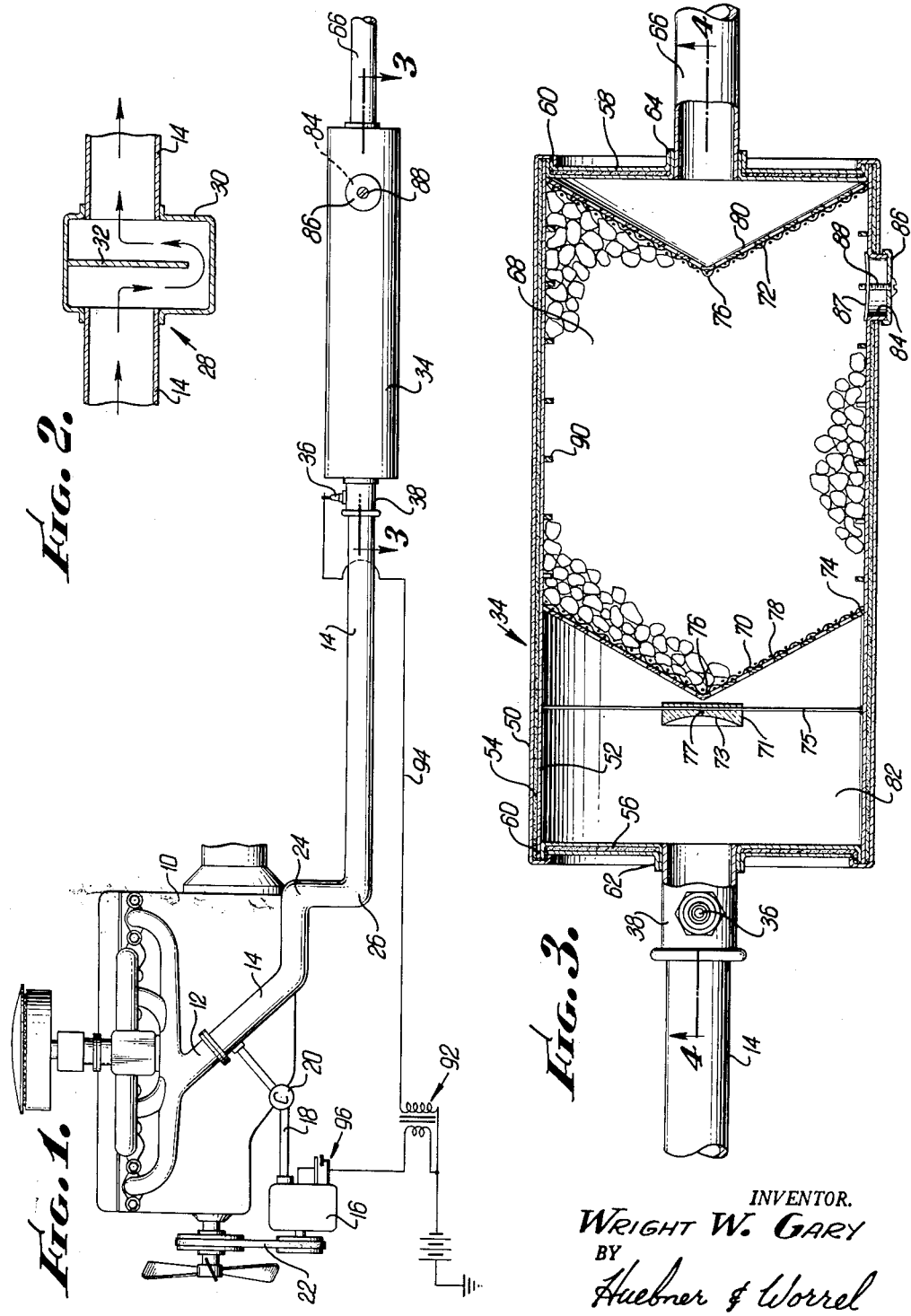
INVENTOR.
WRIGHT W. GARY
BY
Huebner & Worrel
ATTORNEYS.

Nov. 27, 1962 W. W. GARY 3,065,595
CATALYTIC CONVERTER SYSTEM FOR INTERNAL COMBUSTION ENGINES
Filed May 9, 1960 6 Sheets-Sheet 2
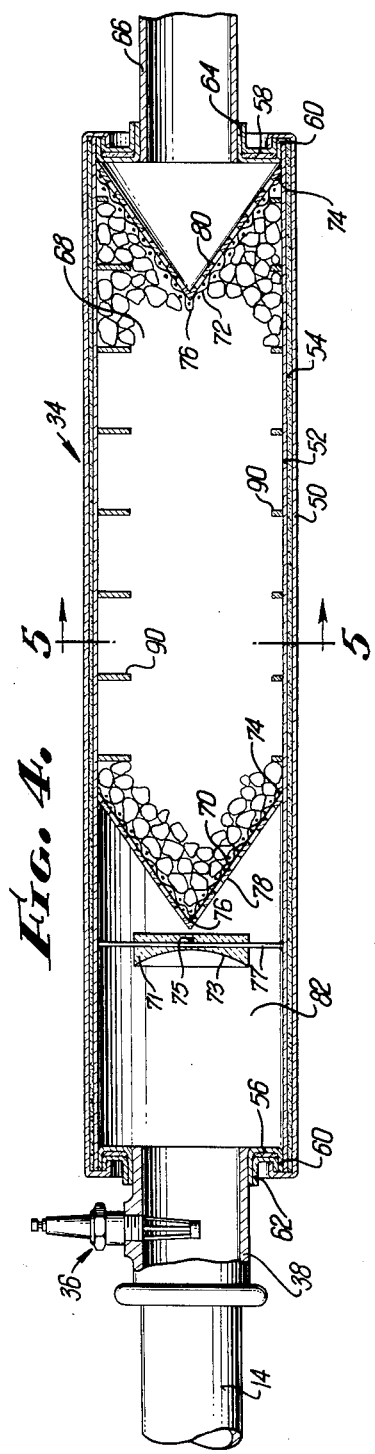
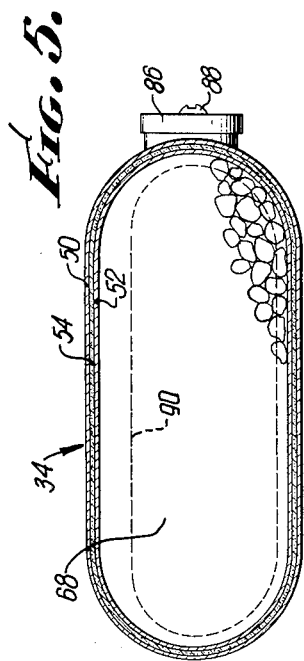
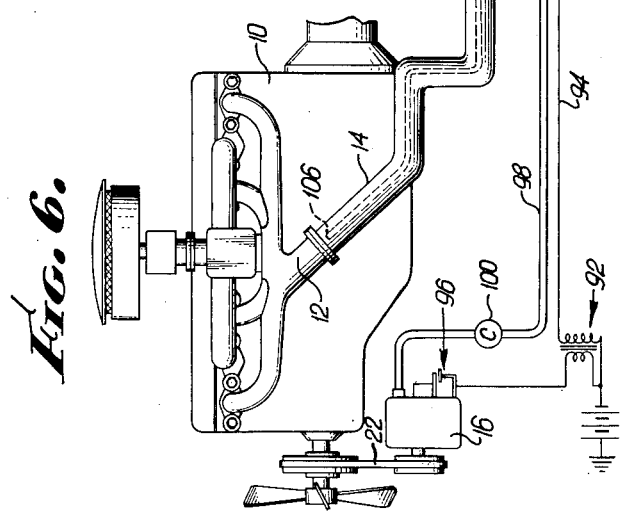
INVENTOR.
WRIGHT W. GARY
BY Huebner & Worrel
ATTORNEYS.

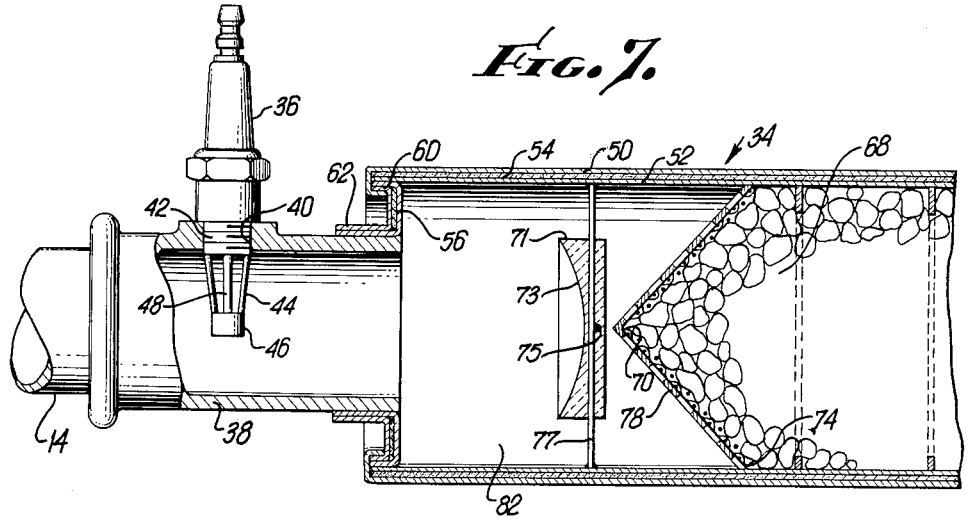
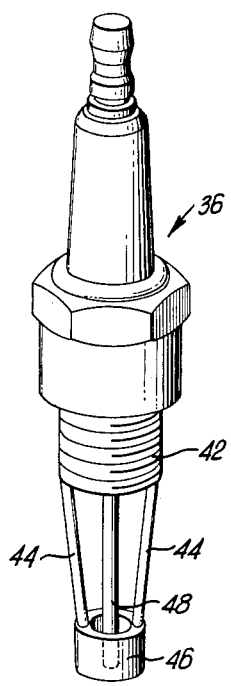
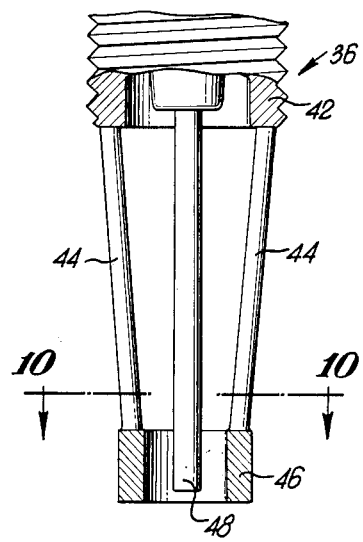
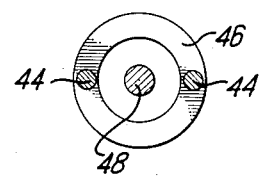

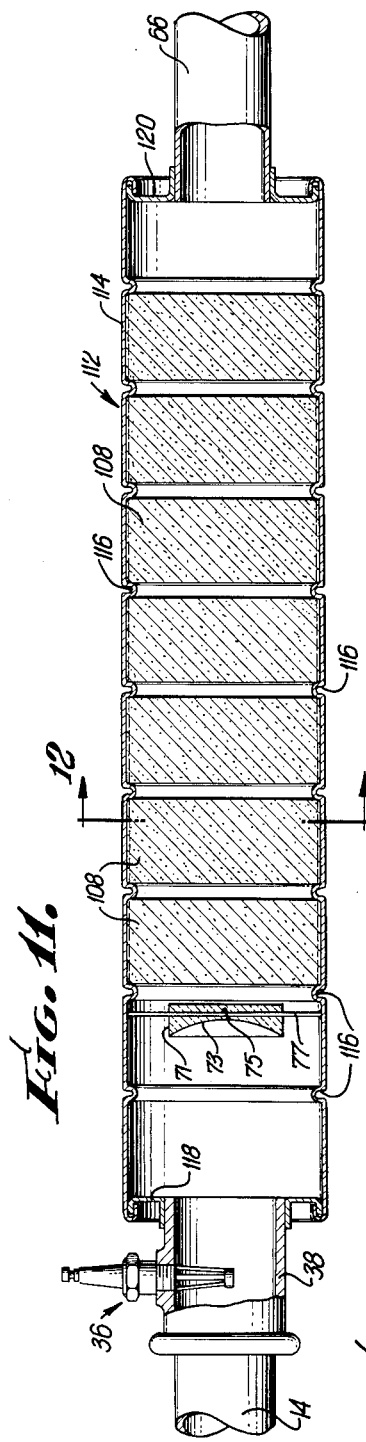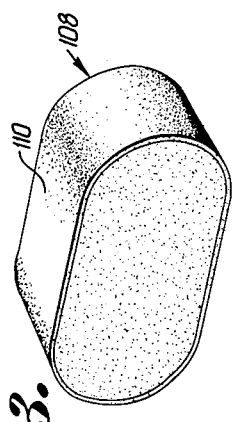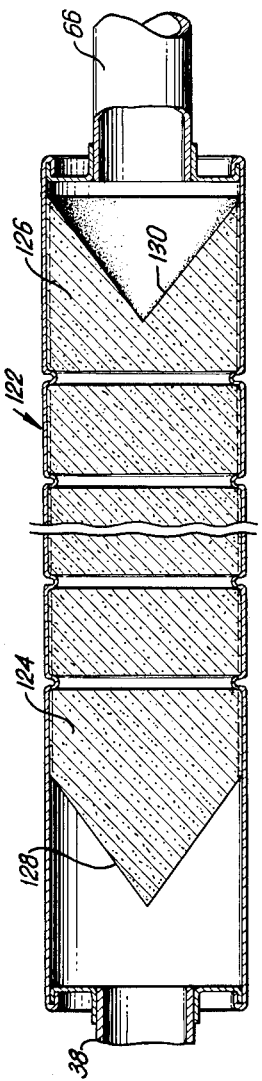

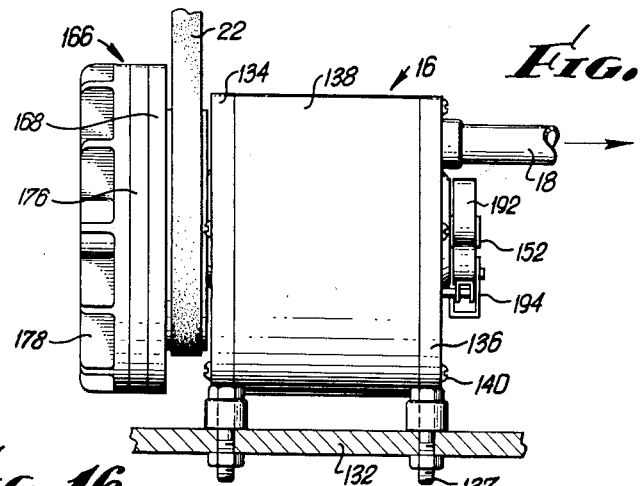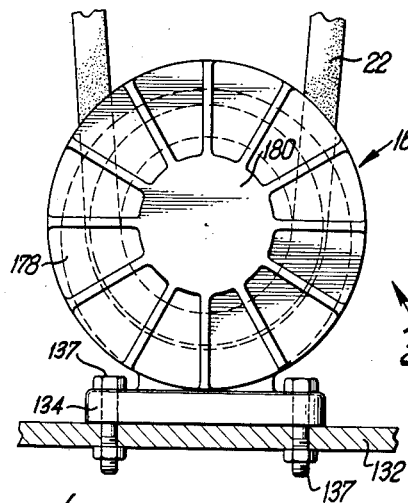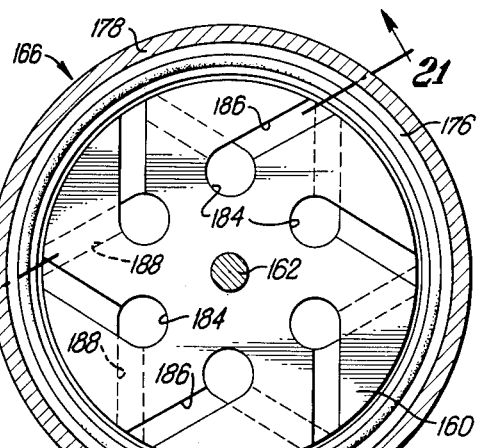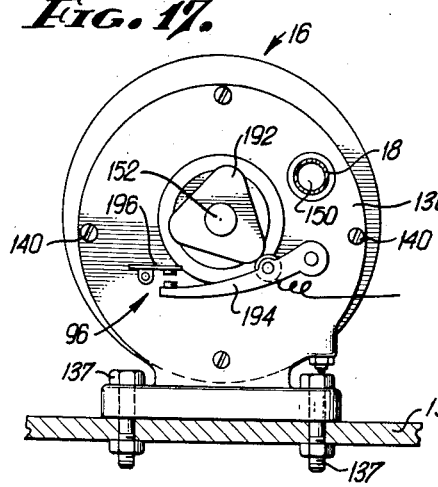

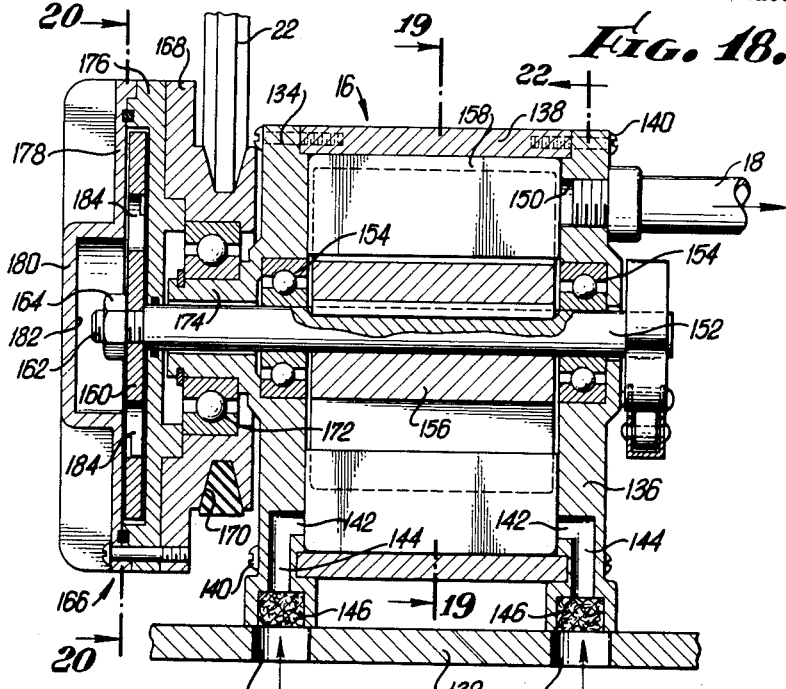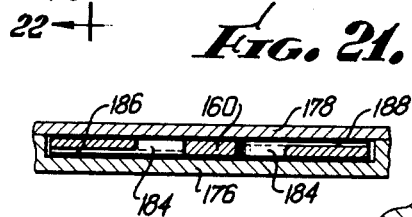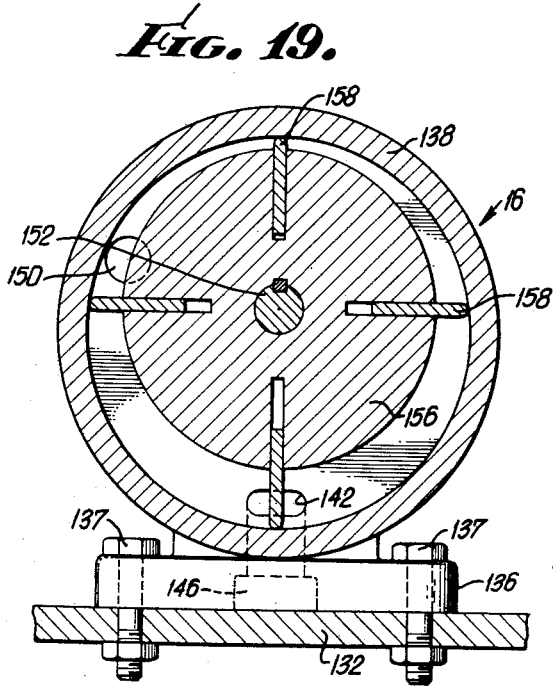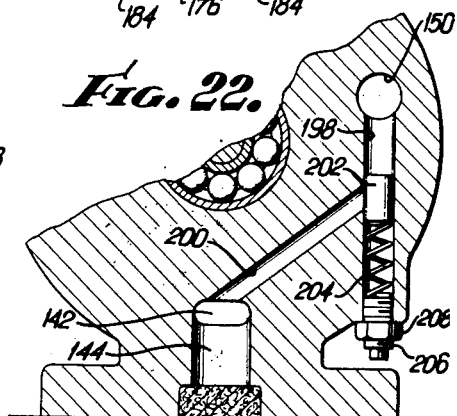

United States Patent Office 3,065,595
Patented Nov. 27, 1962

3,065,595
CATALYTIC CONVERTER SYSTEM FOR INTERNAL COMBUSTION ENGINES
Wright W. Gary, 2317 Kimbridge Road, Beverly Hills, Calif.
Filed May 9, 1960, Ser. No. 27,721
1 Claim. (Cl. 60—30)

The present invention relates to apparatus and methods for reducing the quantities of unburned hydrocarbons and carbon monoxide emitted from the exhaust system of internal combustion engines, and it relates particularly to a new apparatus and method employed in an internal combustion engine exhaust system wherein unburned hydrocarbon and carbon monoxide components of the engine exhaust are oxidized by a novel combination of direct ignition burning and catalytic oxidation.

The exhaust gases from the average automobile contain a mixture of carbon monoxide, carbon dioxide, unburned hydrocarbons, nitrogen, some of the nitrogen oxides, and under certain conditions, portions of unconsumed air. It is well established that these automobile exhaust gases, and similar exhaust gases from other internal combustion engines, accumulate in the atomsphere and react to sunlight to form "smog" which causes eye irritation, is harmful to agricultural production, and appears to be a substantial human health hazard. The unburned hydrocarbons in the exhaust gases appear to be the principal smog producing agents, so that it is important to reduce the hydrocarbon content of the exhaust gases to an absolute minimum. Also, although the carbon monoxide content of the exhaust gases does not appear to be a smog forming element, it is similarly important to reduce the output of this poisonous gas to a minimum. As an example of the amounts of hydrocarbons and carbon monoxide now considered acceptable for exhaust outputs, the California Legislature has recently established a new maximum effluent proposal of 275 parts per million of hydrocarbon content and 1.5% carbon monoxide content in the escaping exhaust.

Prior attempts to reduce the unburned hydrocarabon and carbon monoxide content in the automobile exhaust have taken two forms, namely, (1) "afterburners" for direct burning of the undesired materials with excess air at temperatures above 2000° F., and (2) "catalytic converters" for catalytically oxidizing or burning the unwanted materials with excess air at temperatures above about 500° F., catalytic action permitting such lower temperature burning. However, neither the "afterburner" nor the "catalytic converter" has heretofore proved completely satisfactory under the wide variety of operating condtions which must be met. During "idle" engine operation, the volume of exhaust gases is about 6 cubic feet per minute at a temperature of around 400° F., with an abnormal concentration of gasoline when the engine is first turned on and the automatic choke is operating; while at high automobile speeds (e.g. freeway speeds) the volume of exhaust gases will exceed 100 cubic feet per minute and the temperature will range above 1300° F. The unburned hydrocarbon concentration ranges from an average of about 600 parts per million, up to about 6,000 parts per million during deceleration. It is difficult to provide a satisfactory firing means for an "afterburner," conventional spark plugs being subject to "blowout" when the exhaust gases are moving at high velocity, and often not properly supporting combustion under cold engine conditions or where inadequate quantities of fuel or air are present in the exhaust gases. Often, additional gasoline must be injected directly into the exhaust system with "afterburners" to initiate or to support the combustion.

Similar difficulties are encountered with catalytic converters. For example, under cold starting conditions, it often requires a considerable period of time before the catalyst reaches the necessary 500° F. or higher (preferably 900°–1000° F.), in order to operate efficiently. The relatively high thermal conductivity and heat capacity of catalysts heretofore employed caused the warm-up problem to be particularly difficult for catalyst converts.

In view of these and other problems in the art, it is an object of the present invention to provide a novel apparatus and method in an internal combustion engine exhaust system which combines the direct firing of a portion of the unburned hydrocarbons and carbon monoxide with the catalytic oxidation of a further portion of these undesirable materials in such a manner that the quantities of these materials released to the atmosphere are within acceptable limits for all engine operating conditions.

Another object of the present invention is to provide an exhaust system for an internal combustion engine which includes a case containing catalytic material which replaces the conventional muffler in the exhaust line, a combustion chamber in the case upstream of the catalyst material, an ignition spark plug in the exhaust line upstream of the combustion chamber, and means for supplying fresh air to the exhaust line upstream of the spark plug, the air supply source providing sufficient air at high engine speeds with proper regulation at low engine speeds, and at a rate which is not proportional to the engine speed.

Some of the factors which must be considered in connection with this air supply source for supplying fresh air to the exhaust line upstream of the spark plug are as follows: Using a 235 cubic inch displacement engine, such as a Chervolet 6 cylinder engine, as an example (proportionally more air being required for larger displacement engines), at engine idle speeds of about 450 r.p.m., my converter system requires between about 1½ and 2 cubic feet of air per minute. At this time the amount of excess air which is added is a relatively large percentage of the exhaust volume, which is on the order of 6 cubic feet per minute.

However, when the automobile is in high speed operation, such as on a freeway, the hydrocarbon and carbon monoxide content of the exhaust gas is low, so that the excess air added to the exhaust need be only a very small percentage of the exhaust volume to perform its function of burning these small percentage components. In most cases, with the engine in properly regulated condition, an amount equal to about 2 cubic feet per minute is sufficient. At this time the volume of exhaust gases may exceed 100 cubic feet per minute. If quantities of air in excess of this amount are added, then the excess air serves no beneficial function of conversion, but does have the detrimental effect of cooling the catalytic converter.

At the time of high speed operation the exhaust gases, undiluted with cold air, will reach 1200° F. to 1300° F. temperature, and with about 2 cubic feet per minute of air will be quenched to about 1150° F. If larger amounts of air are added, the converter temperature will be proportionately reduced. At the time of this type of high speed operation, it is not important that the temperature be abnormally high because hydrocarbon and carbon monoxide contents are approaching specification quantities anyway. However, if at such time air is added to the exhaust stream to give a temperature of about 850° F. to 900° F., then when deceleration, idle or heavy acceleration follows, and hydrocarbon and carbon monoxide quantities are both of high level, the catalyst temperature (particularly if the converter has been used on the road for an extended period) would be too low to spontaneously ignite the carbon monoxide (which is, by far, the highest source of burning heat). Since the exhaust gases under deceleration or idle are at a temperature of about 400° F., the catalyst bed without the benefit of the burning carbon monoxide would then rapidly cool and the exhaust gases would not be properly treated.

It is another object of the present invention to provide a novel apparatus and method of the character described for reducing the unburned hydrocarbon and carbon monoxide content of the exhaust gases from an internal combustion engine, wherein a spark plug of novel construction is employed to obtain efficient preignition of the carbon monoxide and hydrocarbons in the exhaust gases before the gases enter the catalyst bed, without likelihood of "blowout" of the plug even under operating conditions in which the velocity of the exhaust gases past the plug is extremely high, the spark plug including a ring-shaped outer electrode suspended from the threaded mounting sleeve of the plug, and a center electrode member extending centrally into the ring-shaped outer electrode, whereby ignition between the electrodes is shielded from blowout by the ring-shaped outer electrode.

This outer electrode ring, being rather heavy, also appears to maintain a degree of heat beneficial to ignition. For example, the ring during high-speed operation will gradually increase in temperature to the temperature of the exhaust stream of gas; namely, 1200° F. to 1300° F., a glowing condition. Immediately following a high-speed operation, it is normal that a period of rather sudden deceleration will take place and large excesses of hydrocarbon will be contained in the exhaust stream. Aside from the benefit of the spark per se, it appears that the heavy metal ring (not having sufficient time to cool below a glowing heat) will also initially ignite the exhaust mixture, and since the flame due to exhaust velocity is swept away, downstream of the spark plug, the spark then continues the flame ignition until a non-combustion condition (lower hydrocarbon and carbon monoxide mixture) eventually is effective, and the burning "goes out."

It is a further object of this invention to provide an apparatus and method of the character described wherein a particulate catalyst is contained in a catalytic case which replaces the conventional exhaust muffler, the case having a forward combustion zone and a catalyst zone behind the combustion zone, the catalyst zone being separated from the combustion zone at the upstream end of the catalyst zone by a conically shaped screen which points forwardly or upstream, and the rear end of the catalyst zone being defined by a similar conically shaped, forwardly directed screen, whereby a small exposed quantity of catalyst material in the tip of the front cone will heat up quickly to give a sudden kick-off to the catalyst reaction immediately after the engine is started, even when the exhaust system is cold; while at the same time the complementary conical shapes of the catalyst zone end walls are such that the catalyst bed has an equal depth from front to rear at all points across the catalyst bed. Also, the forward cone, due to its shape and the velocity of the exhaust gases impinging upon the apex of the cone, causes high turbulence of the air-exhaust mixture entering the case and provides better mixing and burning before entering the catalyst bed section, thereby more completely oxidizing the components.

The tip of the forward cone is subjected to very high temperatures in what appears to be an oxidizing environment, and therefore has a tendency to burn after prolonged road operation of the converter. This burning or eating away of the tip of the forward cone may result from nascent bromine released from the burning of tetraethyl lead which is associated with the bromide, rather than from oxygen as such. In order to protect the tip of the forward cone from such deterioration, it is preferable to support a protective disc or button composed of a material which will not be damaged under the heat and atmosphere conditions present in the case in the combustion zone of the catalytic case just forward of the cone apex, and centrally located. This protective disc or button not only protects the tip of the forward cone by diverting the axial flow of hot gases at that time, but also serves to deflect the finely divided lead oxid formed in the exhaust burning sponsored by the spark plug, throwing it out to the edges of the combustion chamber where it is deposited against the inner wall of the case, thus preventing the lead oxide from "blinding" the catalytic particles and smothering their catalytic action. The lead oxide is possibly augmented by some "road silt" which was too fine for the air filter system to remove. This deposited material tends to be tacky, so that some of it will adhere to the ceramic button, while the remainder will be deflected and accumulated in the inner wall of the case. By providing a concave forward face on the button, the deflection will be enhanced, and a recess will be provided to hold a substantial amount of the accumulated material.

The protective button may be made out of ceramic slip containing active catalyst impregnation as a part of the slip formula. In this way, the rather violent impingement of the abnormally hot gases and air mixture upon the catalytic ceramic disc will tend to set off the burning of the carbon monoxide at this point, and generate quick, high grade heat almost immediately upon starting the car, lowering the catalytic requirements of the catalyst bed following it.

Another object is to provide, in apparatus of the character described, a catalyst material comprising a solid base material having a porous, clay-like surface, with a thin surface impregnation of catalytically active material on the base, the preferred depth of the catalytic impregnation being of the order of about 0.010 inch, and within a preferred range of from about 0.005 inch to about 0.020 inch, whereby substantially all of the active catalytic material is employed in the reaction, and whereby the catalyst structure, including both base and active catalytic materials, has a minimum thermal conductivity and heat capacity so that the catalyst bed will heat up as quickly as possible and will retain its heat as long as possible, in order to provide optimum catalytic action. As a part of the present invention, I provide a novel method for applying this thin impregnation of the active catalytic material on the inert base which involves the application of hot, super-saturated impregnation solutions to the cold base material, whereby the impregnation solutions will "freeze" or solidify in a thin egg-shell surface of impregnation which is controllable by the degree of super-saturation and the temperature range employed.

It is also an object to provide a novel combination of active catalytic materials, preferably comprising iron oxide, copper oxide and chromic oxide, the copper oxide being effective to commence the catalytic action at relatively low starting temperatures, and the iron oxide and chromic oxide providing efficient higher temperature operation.

My new catalyst composition, and also the thin surface application thereof, may be embodied either on particles of the base material having a mean diameter preferably on the order of about .17 inch and in a preferred range of from about .15 inch to about .24 inch; or may be embodied in a porous ceramic block of the base material. The base material preferably has a porous, clay-like surface, and if the base material is of a glassy or silicious nature, then this material may be surfaced with a very thin layer of clay-like material prior to or in conjunction with the application of the oxides performing the catalytic function.

The porous ceramic catalyst blocks may be formed with internal walls which separate the passages therethrough having a thickness on the order of 0.020 inch or less, so that when these walls are substantially completely impregnated with the active catalytic material, the entire useful depth of about .010 inch or less on both sides of the walls would be employed, thus giving a maximum possible efficiency for a given volume of the catalyst, with a low heat capacity and conductivity and a greatly extended surface (per given volume) for contact with the exhaust gases.

In the instance of using the ceramic bricks as the catalytic members in the case, it is preferable to include the relatively non-porous protective ceramic disc or button in the combustion chamber ahead of the brick. As with the particulate catalyst, the ceramic button will divert much of the particulate lead oxide to the wall of the case in the combustion zone ahead of the brick so as to protect the catalytic surfaces of the brick.

A further object of the invention is to provide, in apparatus of the character described, an air pump or compressor for providing fresh combustion air to the exhaust line substantially upstream of the spark plug and catalyst case, the air compressor embodying a novel slip-clutch drive so that the compressor may be driven off of the engine, as by connection with the fan belt, with a minimum of slippage at low engine speeds, and considerable slippage at relatively high engine speeds, to get the desired air-exhaust proportion over all engine speed ranges.

In addition to the slip-clutch drive for regulating the compressor output, it is also desirable to provide a mechanical regulator to limit the output of the compressor. Such a mechanical regulator may simply comprise a by-pass conduit from the compressor outlet port to the inlet port, with a normally closed pressure responsive relief valve in this conduit adapted to open so as to bypass excess air output of the pump when the back pressure on the outlet port exceeds a predetermined minimum value.

Further objects and advantages of the present invention will appear during the course of the following part of the specification wherein the details of construction, mode of operation and novel method steps of a preferred embodiment are described with reference to the accompanying drawings, in which:

FIG. 1 is an elevational view showing an internal combustion engine having an exhaust system embodying the present invention.

FIG. 2 is a vertical section showing a form of diffuser which may be employed in the exhaust line upstream of the catalytic case and spark plug to give the desired turbulence for mixing injected air with the exhaust gases where the exhaust pipe itself does not have the equivalent of two right-angle bends to provide such turbulence.

FIG. 3 is a horizontal section along the line 3—3 in FIG. 1 illustrating a presently preferred embodiment of my catalytic case for containing my particular type of catalyst.

FIG. 4 is a vertical section along the line 4—4 in FIG. 3 further illustrating the catalytic case, and showing my preferred spark plug.

FIG. 5 is a cross-sectional view along the line 5—5 in FIG. 4 further illustrating the preferred catalytic case.

FIG. 6 is an elevational view similar to FIG. 1, but illustrating an alternative air injection system wherein the air line is formed in a heating coil in the rear end of the catalytic case, and then extends upstream to the catalytic case and through a substantial part of the exhaust pipe to introduce the air in the exhaust pipe near the engine.

FIG. 7 is a vertical section similar to the left-hand part of FIG. 4, but enlarged to further illustrate the details of construction of the front part of the catalytic case and of the spark plug and the plug mounting.

FIG. 8 is a perspective view of my new spark plug.

FIG. 9 is an elevational view, partly in section, further illustrating the details of construction of the spark plug.

FIG. 10 is a horizontal section along the line 10—10 in FIG. 9.

FIG. 11 is an axial, vertical section illustrating a modified form of catalytic case embodying a plurality of my porous, ceramic catalyst blocks.

FIG. 12 is a cross-sectional view along the line 12—12 of FIG. 11.

FIG. 13 is a perspective view of one of the individual ceramic blocks shown in FIG. 11.

FIG. 14 is an axial, vertical section illustrating an alternative ceramic catalyst block construction wherein the forwardmost block has a forwardly projecting conical portion, and the rearwardmost block has a complementary conical recess.

FIG. 15 is a side elevation view of an air pump having a slip-clutch drive which I have found to be suitable for providing combustion air to the exhaust line in practising my present invention.

FIG. 16 is an end elevation view of the pump shown in FIG. 15, looking from left to right in FIG. 15.

FIG. 17 is an end elevation view of the air pump looking from right to left in FIG. 15.

FIG. 18 is an axial vertical section showing the internal details of construction of the pump in FIG. 15.

FIG. 19 is a cross-sectional view along the line 19—19 in FIG. 18 showing further details of the pump.

FIG. 20 is a cross-sectional view taken on the line 20—20 of FIG. 18 showing details of the slip-clutch assembly.

FIG. 21 is a sectional view along the line 21—21 in FIG. 20 showing further details of the slip-clutch construction.

FIG. 22 is a fragmentary cross-sectional view along the line 22—22 in FIG. 18 illustrating a presently preferred mechanical output regulator forming a part of the pump.

Referring to the drawings, in FIG. 1 I have illustrated a conventional internal combustion engine 10 having exhaust manifold 12 and exhaust pipe 14 attached thereto. Exhaust pipes currently employed have an internal diameter on the order of about 2 inches.

An air pump 16, preferably of the positive displacement, type, provides air to the exhaust pipe 14 near its connection to manifold 12 through a suitable conduit 18. I have found that a copper tube having an internal diameter of 3/8 inch is adequate for the conduit 18. I prefer to include a check valve 20 in the conduit 18 to protect pump 16 from exhaust gases in the event of pump failure. If desired, the check valve may be provided immediately adjacent to as as a part of the air pump 16, and may comprise a diaphragm of neoprene or flexible plastic with a valve "base" or seat upstream of the diaphragm comprising a part of the pump discharge port. The downstream side of this diaphragm is connected to air conduit 18 at a properly shaped fitting which is easily removable for replacing or inspecting conduit 18.

If desired, conduit 18 may be partly of plastic hose from the air pump to a point closely approaching the entrance to exhaust pipe 14, with metal forming the portion of conduit 18 immediately adjacent to the exhaust pipe. With this construction, in case of failure of the check valve 20, the plastic hose will melt and discharge any hot exhaust gases, thereby protecting both the compressor and the check valve.

Although the pump 16 may be driven by any desired means, such as by a small electric motor, I have found that it is most practical to drive the pump directly off of the engine fan belt 22. Pump 16 may be driven off of either the inside or the outside of the fan belt, and may conveniently be mounted on the vehicle generator if desired.

The air requirements of my present invention are not nearly proportionate to engine speed, and it is accordingly desirable to provide a variable drive for the pump 16. Thus, for engine idle speeds of about 450 r.p.m., my conoverter system requires between about 1½ and 2 cubic feet of air per minute, while at highway speeds on the order of 65 miles per hour, when the engine is rotating at about 2500 r.p.m., the air requirement is only about 2 cubic feet per minute, these figures being for a 235 cubic inch displacement engine (such as a Chevrolet 6 cylinder engine), with larger displacement engines requiring proportionally more air. Although different types of variable drives may be employed to achieve the desired speed ratio between the engine and the pump, such as a centrifugally slipping clutch arrangement or a variable belt drive, I have found in practice that a slip-clutch drive construction like that shown in detail in FIGS. 15-22 is particularly suitable for the present purposes. This drive has the desirable characteristic of greatly increased slippage with increases in engine speed, thereby maintaining only a small increase in pump air output at high speeds over that at low speeds. Also, this slip-clutch drive, by permitting only a small amount of increase in the pump speed for high engine speeds as compared with the pump speed for low engine speeds, keeps the pump operating within a speed range which will involve a minimum of wear and tear in the pump, and will actually prevent rotor blade breakage, pump speeds above 4000 r.p.m. usually destroying or causing rapid erosion of the carbon blades.

Also, it has been found in actual road operation that if the pump has a burned-out bearing or broken blade, the slip-clutch will continue to run and the belt and pulley will function normally; where otherwise something else must give way, which would result in a burned-out belt or further damage to the pump.

As a further means for controlling the pump output volume so as to limit it to the desired 2 cubic feet per minute (for an engine having a displacement of approximately 235 cubic inches, this figure varying for engines having different displacements), I prefer to employ pressure-responsive mechanical regulating means associated with the pump outlet for diverting excess air output of the pump. An example of a suitable regulating device for this purpose is described hereinafter in connection with FIG. 22 of the drawings.

The air is introduced into exhaust pipe 14 near the manifold 12 to get the best possible mixing of the air with the exhaust gases. I have found in practice that to achieve the desired mixing of the air with the exhaust gases for optimum results, it is preferable to have the air-exhaust mixture pass through the equivalent of at least two right-angle bends in the exhaust line before the mixture is fired. In many cases, the exhaust pipe will already have a configuration which includes the equivalent of two right-angle bends, as, for example, the right-angle bends 24 and 26 in the exhaust pipe 14 shown in FIG. 1. However, if the exhaust line on a particular vehicle does not include the equivalent of two right-angle bends, a diffuser may be placed in the exhaust line upstream of my spark plug and catalytic case to achieve similar results. Such a diffuser is shown in FIG. 2, and may merely comprise a small housing 30 disposed in the exhaust line 14, with a transverse baffle plate 32 in housing 30 to divert the flow of exhaust gases and air.

It is desirable to provide a heat-insulating covering over the exhaust pipe 14 between the inlet from air conduit 18 and the spark plug so as to retain the air-exhaust mixture at the highest possible temperature for firing. This insulation may be composed of asbestos or other suitable insulating material.

My catalytic case 34 replaces the conventional muffler in the exhaust line, and has external dimensions comparable to those of the conventional muffler to conform with chassis and road clearance limitations. My spark plug 36 is mounted in the exhaust line closely adjacent to the catalytic case 34 on the upstream side of case 34. For convenience in mounting plug 36, I prefer to provide a special sleeve 38 which is connected at its upstream end to exhaust pipe 14 and at its downstream end to the catalytic case 34. Sleeve 38 is provided with a threaded opening to receive the plug 36.

I have found that a conventional spark plug will "blow itself out" under high exhaust flow conditions, and that a conventional plug will not fire at low exhaust temperatures. To overcome these objections, I have provided my new spark plug 36, which is best shown in detail in FIG. 7, 8, 9 and 10.

Plug 36 includes the usual externally threaded mounting collar 42. Integrally attached to and extending from the lower edge of collar 42 are a plurality of support rods 44. Preferably two of these rods 44 are employed, being joined to the bottom edge of collar 42 in diametrically opposed relationship. Support rods 44 may be peened into holes provided in collar 42, or may be otherwise connected to collar 42, as by welding.

The outer plug terminal 46 comprises a short sleeve member mounted on the lower ends of support rods 44 in axial alignment with the plug. The lower ends of support rods 44 may, if desired, be peened into diametrically opposed holes in the upper edge of the outer terminal 46, or attachment may be made by other means, such as welding or the like.

The inner plug terminal 48 projects downwardly from the center of the plug and has its lower end axially positioned within the outer terminal sleeve 46.

I prefer to suspend the outer terminal sleeve 46 approximately one inch below the plug mounting collar 42, thus to place the outer terminal sleeve 46 as substantially the axial center of the exhaust line, which has an inner diameter of approximately 2 inches. This positioning of the plug terminals in the axial center of the exhaust flow gives the best possible firing results.

Although the terminals of my plug 36 are not limited to any particular sizes, I have achieved excellent results with a plug of this type having an outer terminal sleeve 46 that is about one-quarter inch deep, having a wall thickness of about $3/32$ inch, and having an inner cylindrical wall spaced about 64 thousandths of an inch from the inner terminal 48.

My new spark plug 36 has proven extremely effective in use without failure or fouling, and will not undergo "blowout" under any conditions of automobile operation. The spark will be ignited between the outer terminal 46 and the inner terminal 48 regardless of the amount of velocity and turbulence of the exhaust gases as they pass the plug. Ignition of the exhaust gases by the plug has been observed for exhaust gas temperatures as low as 300° F., which permits my present device to effectively burn unwanted hydrocarbons and carbon monoxide within a matter of seconds after a cold start. For example, when a cold automobile is started, and the exhaust gases are low in temperature, if the automobile operates at a speed even as low as 20 miles per hour, and decelerates within the first minute of operation, the spark plug has been found capable of firing the air exhaust mixture thus produced suddenly, and thereby to raise the temperature to as high as 1600° F., thus quickly heating the catalyst and preventing catalyst lead poisoning which otherwise is particularly bad at such times because the catalyst bed is still cold and overly adsorptive.

The presently preferred catalytic case 34 is illustrated in FIGS. 1, 3, 4, 5 and 7 of the drawings. The catalytic case 34 of my preferred construction includes cylindrical outer and inner metal shells 50 and 52, respectively, with an insulation layer 54 between shells 50 and 52. Any desired insulation material may be employed in layer 54, as, for example, glass wool, woven kaowool, asbestos or the like. The outer and inner shells 50 and 52 may be rolled together with a sheet of the insulation material between them to form the cylindrical portion of the case. For economy and durability, I prefer to employ mild steel for the shells 50 and 52, and it is best that the steel be aluminized to prevent rust and corrosion. Stainless steel could also be used, but would be more expensive.

I employ the double-shell, insulated case because of the fact that burning of both hydrocarbons and carbon monoxide in my device causes temperatures as high as 1700° F. to be produced in the case at times, and the double insulated case protects underside equipment of the automobile, such as brakes, from damage which might otherwise occur from such temperatures, and also protects against car-occupant discomfort. This insulated case also protects against splashing of road water, snow and the like upon an abnormally hot outer surface.

The double wall of the case is approximately one-quarter of an inch thick, and it is preferable to have a flat, oval shape for the cylindrical case as best shown in FIG. 5 so as to minimize flat surfaces or sides which under internal pressure would tend to bulge and enlarge the internal volume of the catalyst case. In order to provide adequate volume for the catalyst bed and forward combustion chamber, I prefer to employ a cylindrical case having internal dimensions of approximately 5 inches high by 12 inches wide by about 24 inches long.

The forward and rear heads 56 and 58 of the case are, like the cylindrical portion of the case, preferably of a double-wall insulated construction, and are provided with peripheral flanges 60 so that the ends of the outer metal shell 50 may be crimped around flanges 60 to secure the forward and rear heads 56 and 58 in position.

The heads 56 and 58 are provided with proper openings defined within axial connection flanges 62 and 64, respectively. Thus, the plug mounting sleeve 38 is integrally attached within the connection flange 62 of forward head 56 as by welding, while a rear portion 66 of the exhaust pipe which opens to the atmosphere is integrally connected within the connection flange 64 of rear head 58, as by welding.

It as been found in practice that the catalyst bed itself should have an axial depth at least twice its mean cross-sectional diameter, and in my presently preferred catalyst case I employ a catalyst bed depth of about 14½ inches. The catalyst bed 68 is contained in the inner metal shell 52 of the case between axially spaced front and rear conical screens 70 and 72, respectively. The front and rear screens 70 and 72, respectively, point forwardly, or upstream, and are of identical shape so that the axial depth of the catalyst bed is uniform across the bed. For a catalyst case of the preferred dimensions set forth above, I prefer to employ conical screens 70 and 72 which have an axial depth of about 3 inches from the base 74 to the point 76 of each screen. The bases 74 of screens 70 and 72 are positioned directly against the inner wall of inner metal shell 52.

The conical screens 70 and 72 are preferably composed of a stainless steel screen having a mesh on the order of between about 15 to 20 wires to the inch. Such screen material has adequate strength and serviceability, and still is fine enough so that the relatively large catalyst particles will not "blind" the screen from the rapid passage of the exhaust gases therethrough.

The conical screens 70 and 72 do not have sufficient structural strength to support themselves, and are accordingly backed-up by respective perforated conical plates 78 and 80 to which screens 72 and 74 are spot-welded. The conical plates 78 and 80 are integrally secured to the inner metal shell 52, as by welding. The catalyst particles are actually contained by the screens 70 and 72 so that the particles can not "blind" the perforations in the conical plates 78 and 80. Thus, the front conical screen 70 is secured to the rear or downstream side of the front perforated plate 78, while the rear screen 72 is secured to the forward or upstream side of the rear plate 80. I have found in practice that a rear perforated plate 80 composed of mild steel holds up very well, but that it is preferable to provide front perforated plate 78 of stainless steel, or possibly aluminized steel, because of the blasts of fire in the ignited exhaust from the spark plug, which not only causes high temperatures but also causes the front perforated plate 78 to go through very sudden shock temperature changes and stresses.

It will be noted that the front conical plate 80 is disposed considerably downstream or to the rear of the forward head 56 of the case, thus providing a combustion chamber 82 in the case forward of the catalyst bed. The distance between the base of the front plate 80 and the inside of the forward head 56 is about 8 inches in my preferred catalytic case 34 as described herein. This relatively large combustion chamber 82 directly ahead of the catalyst bed within the case 34 is an important component of my invention, providing space to burn considerable quantities of hydrocarbons and carbon monoxide which have been ignited by the spark plug 36 before the exhaust gases enter the catalyst bed. Expansion of the gases from the plug mounting sleeve 38 into combustion chamber 82, and the intrusion into the combustion chamber 82 by the forwardly pointing conical plate 78 and screen 70 cause a great deal of gas turbulence in chamber 82 to promote combustion. I have found that by placing the spark plug 36 in the exhaust line just ahead of chamber 82 rather than in chamber 82, the plug is more intimately associated with the gases, due to the narrow channel through which the gases pass, to provide the most effective ignition.

Combustion in the chamber 82 serves three important purposes. First, it generates heat to raise the temperature of the catalyst bed more quickly and to a higher temperature, so as to achieve the best possible catalyst action in the bed. Second, it accomplishes part of the burning of hydrocarbons and carbon monoxide, thus removing excessive reaction requirements from the catalyst bed itself. Third, the combustion of the excess hydrocarbons ahead of the catalyst bed protects the catalyst to a major degree from lead poisoning, this being particularly important when a considerable quantity of raw gasoline passes through the exhaust system, as during sudden automobile deceleration. A sudden release of the accelerator pedal creates a high vacuum on the carburetor, causing excess gasoline to pass through the engine with substantially incomplete combustion, causing the exhaust gases to be high in unburned or only partially burned gasoline. The tetraethyl lead in this gasoline is in an organic form and when adsorbed by a catalyst, impregnates the catalyst with a soluble lead compound, thus poisoning the catalyst. However, with my pre-ignition of this deceleration gasoline-air-exhaust mixture, the lead-organic compounds are burned and substantially destroyed before entering the catalyst bed, the lead content of the exhaust which actually enters the catalyst bed being in the form of lead oxide "dust" which will either pass through the catalytic bed unadsorbed, or will merely coat the catalyst particles as a light powder which will ultimately blow out of the catalyst bed as it accumulates.

One of the principal advantages of employing the conical catalyst retainer screens is that a small volume of the catalyst in the apex of the front cone is, in effect, exposed to the heat of the ignited gases in combustion chamber 82 so that it is quickly heated to the 500 or more degrees F. required for effective catalytic action, thus "kicking-off" the catalyst reaction in the catalyst bed 68. By this means, effective catalyst action occurs within about the first minute after a cold engine is started.

To protect the apex portion of the front cone from high temperature oxidation which might otherwise occur as a result of the direct impingement of the high temperature exhaust flow against the cone apex, and further to provide a means for diverting the lead oxide "dust" and fine "road silt" which may be contained in the exhaust stream toward the inner wall of the case so that these finely divided particles will not "blind" the catalyst bed, I prefer to support a heat resistant protective disc or button 71 just forward of the cone apex in a central position within the case. The disc or button 71 may be composed of any suitable heat and chemical resistant material. An example of a suitable material is relatively non-porous ceramic, quartz or the like, which has low coefficient of thermal expansion or contraction. Control over the thermal expansion or contraction in the ceramic may be achieved by including appropriate quantities of lithium in the ceramic composition. The protective button may, if desired, be composed of a metal or any other material which will withstand the temperature and chemical conditions present in the case. An example of a suitable metal is nichrome. Although this protective button is not critical as to size, in a catalytic case having the preferred dimensions as set forth above, the button is preferably about 2¾ inches in diameter, with an axial thickness of about ¾ inch. In order to enhance the deflection of the lead oxide particles so that a maximum thereof will be deposited on the inner wall of the case, and also to provide a receptacle for retaining a substantial quantity of the relatively "tacky" deposited material on the button itself, I prefer to provide a concave forward face 73 on the button 71. The axial depth of the concavity of face 73 is preferably about ½ inch for a button 71 which is about ¾ inch thick.

The button 71 is preferably made out of ceramic "slip" like that used in making ceramic catalytic blocks as hereinafter described in connection with FIGS. 11, 12, 13 and 14 of the drawings, but with the ceramic button being made in a relatively non-porous form. It is desirable to include as a part of this slip formula impregnation materials such as those hereinafter described in connection with the particulate and porous ceramic catalysts for providing active catalytic chemicals in the ceramic button. By thus including the active catalytic agents in the ceramic button, the rather violent impingement of the hot gases and air mixture of the exhaust stream upon the ceramic button will tend to set off the burning of the carbon monoxide at this point, quickly generating a considerable amount of heat almost immediately upon starting the car, thereby lowering the catalytic requirements of the catalyst bed following the button.

The protective disc or button 71 is preferably positioned relatively close to the forward cone apex, on the order of about ⅛ inch forward of the cone apex in the catalytic case of the aforesaid preferred dimensions. Although the button may be supported in this position in any convenient manner, a presently preferred means is to provide a pair of metal rods 75 and 77, which may be of welding rod stock, if desired, the rods extending at right angles to each other through a pair of diametral holes through the disc, with the ends of rods 75 and 77 being welded to the inner wall of the case.

With further reference to the preferred catalytic case 34, it is easier to introduce the particulate catalyst into the case after the case has been completely constructed, and it is therefore desirable to provide an opening 84 through the case wall, which may merely be punched out, the opening 84 communicating with the inside of the case just forward of the rear screen 72. After the catalyst has been loaded, the opening 84 may be covered by a suitable cap 86. Cap 86 may be attached to the case by inserting a bar 87 across the inside of opening 84, with a screw 88 extending through cap 86 and threadedly engaged to bar 87.

A plurality of axially spaced ribs 90 extend inwardly of the inner case shell 52 into the catalyst bed 68. These ribs 90 extend all of the way around the inner shell 52. The portions of ribs 90 which extend across the top wall of shell 52 are preferably about ¾ inch wide so as to serve not only as case stiffeners but also to serve as baffles to prevent channeling of the gases through the catalyst bed in the event of any catalyst shrinkage. The remaining portions of ribs 90 at the sides and bottom of shell 52 may only be about ¼ inch wide, serving primarily to stiffen the case against deformation.

Referring now to the catalyst itself, the minimum size of the catalyst particles is governed by the maximum acceptable back pressure on the exhaust. However, the smaller the catalyst particles, the greater the amount of effective catalyst surface area of the particles. I have found in practice that a mean particle diameter of about 0.17 inch is satisfactory, and that the particle size ranges preferably between about 0.15 inch and about 0.24 inch will achieve satisfactory results.

The catalyst particles comprise a carrier base which has a porous, clay-like, unglazed surface to permit impregnation by the active catalytic material. Since the catalyst must be capable of resisting sudden temperature changes, on the order of 100° F. to 1900° F. in a matter of seconds, the catalyst base should be one which does not "heat fracture" or shrink during use, which might cause voids where gases may by-pass without catalytic contact. Another important characteristic of the catalyst is that it should have a low heat capacity, so that the catalytic bed will heat quickly from a "cold start." Also, the catalyst should be a poor heat conductor, so that it will not dissipate the heat of reaction too quickly and will remain at a higher effective temperature during operation. Such low heat capacity and conductivity may be provided by use of a base material of as low density as possible, and by adding to the base particles only that amount of active catalytic material which is actually usable during the catalytic reaction.

Although any base particles having the foregoing general characteristics may be employed, I have found base particles to be satisfactory which are made of the mineral "kaolin" as processed by Minerals and Chemicals, and commercially available in spheres called "Kaospheres," this material being practically pure kaolin (45% $Al_2O_3$, 55% $SiO_2$). However, this material will shrink when subjected to the temperatures present in my catalytic case, and I therefore preshrink the particles before use at a temperature of 1900° F. to 2000° F., either before or after impregnation by the active catalytic material.

It appears that the best catalytic surface is a clay-like surface which contains pores on the order of about 20 angstroms diameter (determined by nitrogen adsorption) with a minimum total surface within the pores of about 80 square meters per gram. This extended pore angstrom surface not only promotes excellent catalytic action of the active catalytic material impregnated thereon, but also appears to provide an effective trap for the lead and other catalyst poisons in the exhaust, with enough surface left over to do a good job catalytically after many hours of use.

Such a port angstrom surface exists in the "Kaospheres" before they are calcined for pre-shrinking at 1900° F. to 2000° F., but it is believed that this calcining may somewhat damage this finely porous surface. For this reason I prefer to provide base particles of another material which will have the desired characteristics of low heat capacity and conductivity and resistance to heat shrinkage, heat fracture and attrition, and to coat such base particles with a thin layer of micronized "Kaospheres" or other clay material, either before or during the impregnation of the active catalytic chemicals. Suitable base particles are extruded pellets of "Celite," as made by Johns Manville. "Celite" is diatomaceous earth which is pure silicon oxide, and particles of this material do not appear to undergo any appreciable shrinkage at temperatures up to 2000° F., are very light in weight and are not likely to undergo "heat fracture," and after impregnation are relatively hard and not likely to attrite through shaking on the road in the catalyst case. This coating of finely divided kaolin or other clay material on the surfaces of the particles will not be calcined for shrinking, and hence will have the desired large number of pores of the 20 angstrom type. Because this coating is thin, if it does gradually shrink upon the surface in use, this will not adversely effect the catalyst, since the base upon which it resides does not shrink, and therefore the catalyst bed will still be of substantially constant size in the case.

Pellets of "Celite" also appear to be effective as the base particles without this added clay-like coating where they are produced with carbonaceous material which is burned out so as to leave pores in the pellets. A still further procedure for enhancing the catalytic performance of the "Celite" particles is to mix the "Celite" with the kaolin or other clay material when the "Celite" pellets are extruded.

It will be apparent that a wide variety of base materials may be superficially surfaced with a thin layer of clay-like material, even if the base is of a glassy or silicious nature or otherwise does not possess the desired porosity. For example, base particles of pure silica or pure alumina may be employed when thus coated.

A wide selection of active catalytic chemicals is available for impregnation of the carrier particles. However, oxides of the multi-valent metals are the presently preferred active catalytic agents for hydrocarbon and carbon monoxide oxidation because they maintain high activity during use, they are relatively unsusceptible to poisons such as lead, phosphoric acid, boron and sulfur, and because they are relatively cheap. Oxides of such multi-valent metals as iron, chromium, copper, cobalt, manganese, molybdenum, nickel, platinum and palladium are effective.

The usual prior art procedure for impregnating catalyst base particles with such oxides is to soak the base in a solution of a salt of the metal (such as a nitrate or a sulfate), and then precipitate the metal oxide with ammonium hydroxide, and subsequently wash out the remaining soluble salts (such as ammonium nitrate or sulfate) with water, and then heat the catalyst to "activate" the catalyst, this heating sometimes being performed in a reducing atmosphere of hydrogen. This prior art soaking treatment permeates the full depth of the base particles, and such complete impregnation of the base particles with the catalyst is both unnecessary and undesirable.

I have found that since the reaction time of the catalyst particles upon the exhaust gases is extremely short, being as low as one-tenth of a second, the useful catalytic depth is only about 0.010 inch below the surfaces of the particles. Any additional catalyst in the particles below that depth appears to be completely wasted, thus unnecessarily adding to the cost of the ingredients, and also considerably increasing the density of the particles, thus undesirably increasing the heat capacity and heat conductivity of the particles. Thus, in practicing the present invention, I limit the depth of the active catalytic chemicals to a preferred depth of about 0.010 inch, with a preferred depth range of from about .005 inch to about .020 inch.

In order to thus limit the depth of impregnation, I apply a super-saturated solution of the impregnating salts at elevated temperatures to cold base particles, which causes an instantaneous "freezing" or solidifying of the impregnating solution on the surfaces of the particles, thereby preventing voluminous internal adsorption and creating an eggshell surface of impregnation which can be controlled in depth by the degree of super-saturation employed and by the temperature range. Following this controlled surface impregnation, ammonium hydroxide solution or ammonia gas is then applied for precipitating the oxide catalyst in this eggshell form, this being followed by conventional water washing. It is to be noted that in addition to the other advantages of this surface impregnation, the washing effectiveness is enhanced because of the availability of the salts at the surfaces of the particles.

I prefer to employ an active catalyst composition which includes ferric oxide which is promoted with a quantity of chromic oxide, and also copper oxide. I find that the copper oxide considerably aids the low temperature activity of the catalyst. A presently preferred impregnation solution which is readily available and of relatively low cost comprises a 50% solution of ferric sulfate in water, which includes a quantity of chromic acid and some copper sulfate. This solution is preferably heated to about 170° F., although the temperature may be varied according to the degree of super-saturation of the chemical solution. This solution is then applied to the base particles which are at ambient temperature, the chemical solution "freezing" as aforesaid to provide the thin surface layer of impregnation. Ammonium hydroxide solution or ammonia gas is then applied for precipitating the oxide catalyst, and the particles are then water-washed. The water-washing removes the sulfate as water soluble ammonium sulfate, leaving the iron on the surface of the base as iron hydroxide, which upon heating (at a temperature as low as 500° F.) envolves water vapor, reducing the iron hydroxide to iron oxide. This leaves a final catalyst impregnated agent comprising a complex of ferric oxide, chromic oxide and copper oxide.

Although I prefer to include the chromic acid in the original ferric sulfate and copper sulfate solution, the chromic acid may, alternatively, be applied after the impregnation by the ferric sulfate and copper sulfate solution and the application of ammonium hydroxide or ammonia to form ferric oxide and copper oxide, and after the particles have been washed. This later application of the chromic acid may be accomplished by tumbling or rolling the wet, water-washed particles with a quantity of dry flake chromic acid. The moisture on the surfaces of the water-washed catalyst particles dissolves the chromic acid, but since the catalyst particles are already saturated with water, the chromic acid remains substantially on the surface with the iron oxide and copper oxide, and upon drying, is converted to chromic oxide. The particles are then heated for activation.

I prefer to use an impregnation formula which, after the final heating or "calcining" leaves, per cubic foot of the catalyst particles, about 6 lbs. of ferric oxide, 3 lbs. of chromic oxide and 1½ lbs. of copper oxide. Based upon weight percent of the base material, where the base material comprises "Kaospheres," the preferred percentages of the active catalytic ingredients are about 8% ferric oxide, 4% chromic oxide and 2% copper oxide. For the lighter density "Celite 408" by Johns Manville, these percentages would be about 12% ferric oxide, 6% chromic oxide and 3% copper oxide.

Referring again to FIG. 1 of the drawings, the spark plug 36 is provided with interrupted, high voltage electricity from spark coil 92 through electrical conductor 94. The spark coil 92 may comprise a conventional automatic automobile spark coil, which is actually a high voltage step-up transformer. Interrupted current is provided to the primary winding of coil 92 from the automobile electrical system, this current being interrupted by a set of interrupter points 96 which, if desired, may be actuated by a cam member connected to the shaft of air pump 16 in the manner best shown in FIGS. 15, 17 and 18, and hereinafter described in connection with those figures.

In FIG. 6 of the drawings, I have illustrated alternative means for introducing the fresh air into the exhaust line, wherein the air is pre-heated to increase the efficiency of oxidation of hydrocarbons and carbon monoxide in the system. This pre-heating is desirable as the efficiency of the catalyst bed decreases after the apparatus has been employed for a considerable period of time.

The air is pumped from air pump 16 through conduit 98, which may comprise a copper tube similar to conduit 18 in FIG. 1 for the portion thereof that is external to the catalyst case and the exhaust pipe, but which is preferably composed of alloy steel tubing for the portion thereof that is within the catalyst case and the exhaust pipe. A check valve 100 is preferably included in conduit 98, and may be associated with the air pump outlet port as described in connection with FIG. 1. Conduit 98 extends through the wall of catalyst case 34 near the rear end of case 34, and may be coiled within the small rear chamber 102 between the rear head 58 and the catalyst bed, conduit 98 thus forming a heating coil 104 in the rear portion of the catalyst case. Conduit 98 then extends forwardly through the catalyst case and through the exhaust pipe, so that its outlet end 106 will be positioned near the connection between exhaust pipe 14 and exhaust manifold 12. In this manner, heat will be transferred to conduit 98 and to the air therein from both the exhaust pipe and the catalyst bed.

In FIGS. 11, 12, 13 and 14, I have illustrated an alternative embodiment of my catalytic reactor which employs a plurality of porous ceramic blocks which are impregnated throughout with the active catalytic material. Referring at first to FIGS. 11, 12 and 13, the ceramic blocks 108 are preferably provided in a flat oval shape with axis dimensions of about 4½ inches high and about 9 inches wide, with an axial depth or thickness of about 2 to 2½ inches. It will be noted that the cross-sectional area of these porous blocks is somewhat smaller than the corresponding cross-sectional area of the catalyst bed 68 where the particulate catalyst is employed, as best shown in FIGS. 3, 4 and 5. The smaller size is permitted by the increased efficiency of the porous ceramic block catalyst. Even with this reduced size, the ceramic block catalyst will have many times the effective catalyst surface area therein as compared with the particulate catalyst without having a back pressure any greater than that normally encountered in a conventional muffler, and will therefore function more efficiently and for a longer period of time than the particulate catalyst. This greatly increased surface area in the porous ceramic catalyst is permitted because the web partition walls within the ceramic blocks may be provided with a thickness of about 0.020 inch or less, whereby the entire supporting ceramic material throughout the blocks may be impregnated with catalyst, substantially all of the catalyst being usefully exposed within a depth of about 0.010 inch or less on opposite sides of these thin web partition walls.

The ceramic catalyst blocks are preferably constructed from clay materials normally used for making ceramic brick or porous porcelains, and are usually formed by soaking the ceramic slip into a carbonaceous or organic porous structure, removing the excess slip from the structure by squeezing or alternatively by blowing with air, or sucking by vacuum, leaving the slip in a thin layer on the porous structure, so that upon drying and firing at a temperature on the order of about 2000° F. the thickness of the membranes of ceramic material remaining after burning out the carbonaceous or organic porous structure will be approximately 0.020 inch or less. This results in rigid, non-shrinkable structures having the desired high porosity and thin partition walls. Nevertheless, because of the very thin honeycomb walls throughout the blocks, they are relatively fragile, and it is accordingly desirable to provide a reinforcing ceramic layer 110 of reduced porosity and increased strength about the periphery of each of the blocks. This peripheral layer 110 may be made by painting each block around its edge surface with an air hardening cement such as "Sourisen" or "Harwaco" bond, or may be provided in the original manufacture of the blocks by incorporating less or no "burnout" material in the peripheral edges.

According to another procedure for making the blocks, the mixture of minerals usually used for ceramic purposes, such as feldspar, fire, china and ball clays, nepheline synite, and the like, is mixed with a "burnout" material such as cork, saw-dust, wood flour, grass, straw, petroleum tar or the like, as is used in making lightweight insulating brick. However, for the present purpose, the "burnout" content is increased over that used in making conventional lightweight insulating brick, and the burnout material may be oriented primarily with the length of the burnout material arranged in the direction of gas flow, that is, through the 2–2½ inch axial width of the blocks, so as to provide maximum porosity in the direction of gas flow to aid pressure drop, while retaining adequate structural strength.

The active catalytic chemicals embodied in the ceramic block type of catalyst are the same as those described above in detail in connection with the particulate catalyst. The clay material can be mixed with the salts of the impregnating catalytic materials as the blocks are originally pressed to shape or extruded, and after completion of firing, the active catalytic material will constitute a major portion of the honeycomb walls in the blocks. Salts of the desired multi-valent metal elements will be oxidized upon firing to provide the desired metal oxide catalyst composition in the blocks, such as ferric oxide, chromic oxide and copper oxide. If the activity of the catalyst in the walls is lower than desired, then the walls may be etched with acid to better expose the catalyst, and then reactivated by heating.

An example of one procedure which I have followed in producing the catalyst blocks is as follows: Iron rouge and water were added to a clay slip mixture normally used for porous ceramics. The final mixture, by weight, was 34.5% clay components, 20.2% iron rouge ($Fe_2O_3$) and 55.3% water. This clay-iron slip was placed in a suitable container into which vinyl sponges were immersed. The sponges were worked under the slip until soft and saturated, after which the sponges were squeezed as dry as possible. These sponges were then slowly dried with mild heat under a heat lamp. After drying the sponges were placed in a kiln and fired to 1900° F. All of the vinyl sponge material was consumed and burned, leaving rigid clay bricks impregnated throughout with the iron oxide. The resulting bricks were of excellent porosity, were of good strength, and were brown in color from the iron oxide.

The bricks were then immersed in a solution of chromic acid of 12½% strength by weight, and subsequently dried and activated at 600° F., changing the chromic acid to chromic oxide, and through reaction with the iron in the ceramic, also converting some chromic acid to iron chromate. The final brick comprised 56% ceramic, 32% iron oxide and 12% chromic oxide. The density of the brick per cubic foot was 30 pounds. The partition wall thicknesses throughout the brick were about 0.020 inch, with a mean pore diameter on the order of about 0.040 inch.

The blocks thus produced are then trimmed to accurate dimensions, and an air drying cement painted around the oval edge of each block, this cement hardening so as to "eggshell" the blocks against edge damage.

Although I have thus obtained satisfactory results by employing vinyl sponges for the carbonaceous or organic porous structure which is burned out during firing of the blocks, I prefer to employ a plastic sponge material which has larger pores, and which will therefore result in finished catalytic blocks of greater porosity, causing reduced exhaust back pressure, than those resulting from the use of vinyl sponges. I have found that polyurethane ester sponge with large holes has pores of about the right size, but that these pores are preponderantly closed with very thin membranes, referred to in the plastics art as "flaps," which extend across the plastic web in the sponge. If these "flaps" were left in polyurethane ester sponges employed for producing my porous ceramic blocks, the resulting blocks would produce an untenably high back pressure in operation. However, by squeezing the polyurethane ester sponges while immersed in a suitable solution for a short period of time these "flaps" can be dissolved to the desired extent, without substantial "eating" of the web plastic, providing sponges which, after subsequent ceramic impregnation and firing, result in highly porous ceramic blocks which produce very low exhaust back pressure.

An example of a procedure which has proven effective for removing substantially all of these "flaps" in polyurethane ester sponges is to immerse and squeeze the sponges for 2 minutes in a sodium hydroxide solution of 25% strength by weight at a temperature of 180° F. Similarly effective "deflapping" resulted from immersion and squeezing of the sponges for 1 minute in the same solution at 200° F. Using polyurethane ester sponges thus prepared as the carbonaceous or organic porous structure (which is later burned out) for forming the porous ceramic blocks, the resultant ceramic product gave a surprisingly low back pressure equivalent to only 1¼ inches of water for a ceramic bed 12 inches deep of 32 square inches cross-sectional area, with an exhaust gas flow of 50 cubic feet per minute. The ceramic webbing thus produced was very good, the ceramic strong, and the surface for catalytic reaction was about tenfold the surface of the particulate catalyst in the preferred particulate catalyst case 34 described above. The back pressure of the particulate catalyst bed in the case 34 at 50 cubic feet per minute exhaust gas flow is equivalent to about 7 to 9 inches of water. Further, the intricate ceramic web of this product is effective to trap any lead oxide or road silt in the first brick or two, leaving the subsequent bricks clean for the catalytic reaction.

By reducing or eliminating the step of squeezing the polyurethane ester sponges during the "deflapping," some of the flaps can be retained in the sponges, which will increase the interval surface area of the porous ceramic blocks produced. This may be done while still keeping the back pressure within acceptable limits.

It is to be understood that the foregoing "deflapping" procedure is given merely as an illustration of one suitable procedure, and it will be obvious that variations in the solution, temperature and timing may be employed with similar results. It is to be noted that prolonged immersion in the 25% by weight sodium hydroxide solution at room temperature was ineffective for removing the "flaps," while immersion for 8 minutes at 200° F. not only removed the "flaps" but almost completely ate the remaining web.

Tests on sponges of the companion plastic, polyurethane ether (a more common variety of the polyurethane group) showed that sponges of this material were more resistant to "deflapping," requiring immersion in the same solution at 200° F. for at least 10 minutes to remove the flaps.

While it is obvious that a very wide variety of ceramic slip formulas may be employed, and the present invention is not in any way limited to any particular formula, an example of a slip formula, with catalytic components included, which has provided good results with the polyurethane ester sponges is approximately as follows:

| | Percent |
|---|---|
| Tennessee ball clay | 9.1 |
| California kaolin | 9.1 |
| Plastic vitrox | 13.7 |
| Talc | 27.6 |
| Iron oxide rouge | 30.5 |
| Copper oxide | 10.0 |
| Total solids | 100.0 |

To these solids was added 28.5% (of the weight of the solids) of water containing small quantities of sodium silicate, soda ash and vitrofoss. The amounts of these last ingredients included with 65.8 pounds of the solids were 160 cc. of 25% solution of sodium silicate, 77 cc. of 10% soda ash solution and 350 cc. of 10% vitrofoss. The foregoing slip mixture weighs 63¼ ounces per quart.

While there is nothing significant or exact in the above slip formula, it has shown that this general type of slip mixture provides the following results: (1) a good ceramic with minor shrinkage and good strength, (2) good "thinness" so that when the plastic is squeezed, any desired amount of ceramic slip remains (good blocks with a total weight as low as 10 pounds per cubic foot having been produced), (3) surface tension of the slip such that no ceramic "flaps" blind the web or arch over the holes, and (4) inclusion of the catalytic ingredients in the ceramic formula (with the exception of the final addition of the chromic acid to etch and activate the surfaces).

These slip-impregnated plastic sponges are slowly dried, then fired to about 400° F. to decompose or volatilize the plastic, and then fired to from 1900° to 2000° F. The drying and plastic firing steps are preferably taken slowly so that abnormal volatilization does not rupture the ceramic texture, but after these two steps have been passed, the firing can be conducted quite rapidly.

Another example of a procedure for producing the catalyst blocks is to mix fire clay with straw and a binder, including in this mixture a quantity of ferric sulfate which will yield about 6 lbs. per cubic foot of ferric oxide upon firing. Also included may be other ingredients such as chromic acid and copper sulfate which will produce chromic oxide and copper oxide upon firing. The sulfate content of the ferric sulfate, upon heating, liberates sulfur dioxide gas, causing a frothing and swelling of the fire clay. The straw burns and further aids the porosity of the final block, and with the straw being generally axially directed in the original pressing, when the straw is burned out it will leave axial pores through the blocks of the desired size, as given by the size of the straw. When the blocks have been fired and cooled, they are then trimmed and painted about the oval edge with an air drying cement to "eggshell" the blocks against edge damage.

An alternative method of fabricating the porous ceramic blocks is to produce the blocks without including the salts of the final catalyst oxides, and then, after completion of the blocks, to soak the solution containing the impregnating salts thoroughly throughout the blocks. This soaking is preferably accomplished by boiling, or by prior evacuation of the blocks to remove air. Then, the water of solution is slowly evaporated so that the salt will remain upon the "honeycomb" walls. The blocks are then fired so that the salts will decompose to the catalyst oxides, or, alternatively, the salts may be reacted with ammonium gas or ammonium hydroxide. The blocks are then water-washed and dried.

The completed blocks are then placed in a catalyst case 112 by rolling the case shell 114 around the blocks with the blocks laid side-by-side. It is preferable to space the consecutive blocks slightly apart to permit crimping of the case shell 114 between adjacent blocks to form shallow intervening ribs 116. These crimped ribs 116 serve to seal each block in place so that gases will not by-pass around the blocks, which is particularly important in the event of any shrinkage of the blocks. The ribs 116 have the further advantage that if one block is damaged, it will be self-contained. Also, by thus separating the individual blocks, gas diffusion will occur between the blocks, retarding possible channeling of the exhaust gases.

Although the catalyst case shell 114 may be insulated, if desired, this is not necessary with my preferred porous blocks because of the extremely low heat conductivity of the blocks, and because the cemented, non-adsorptive peripheral edges of the blocks serve as an insulating medium.

As with the particulate catalytic case, it is desirable to support the heat resistant protective disc or button 71 centrally within the ceramic block catalyst case 112 in the combustion chamber ahead of the first block 108, to throw out as much as possible of the particulate lead oxide so as to protect the following catalytic surfaces in the blocks.

The catalytic case 112 is completed by front and rear end heads 118 and 120, respectively.

The performance of my porous ceramic catalyst is much higher than that of the particulate catalyst in view of the greatly increased effective surface area. While the effective surface area of the particulate catalyst bed is on the order of about 100 sq. ft., the effective area of the porous block type of catalyst is on the order of about 400 sq. ft. or higher. If desired, by decreasing the thickness of the partition walls this effective surface area within the block catalyst bed can be increased to as much as about 1,000 sq. ft. This provides a much longer effective life for the block type of catalyst, as the life of the catalyst is directly dependent upon the amount of surface area. This greatly increased surface area in the porous block type of catalyst has the further advantage of a greatly increased capacity of the catalyst for poisons without serious decrease of catalytic effect. The porous blocks also have a greater filtering effect than the particulate catalyst, thus further assisting in the removal of poisons in the forward part of the catalyst bed, leaving a substantial portion of the catalyst bed substantially undamaged by poisons.

It is to be noted that if desired, the particulate type of catalyst may be composed of porous particles similar in composition to the porous ceramic blocks, but the blocks appear to be preferable due to their greater strength and resistance to damage from abrasion.

In FIG. 14 I have illustrated a catalyst case 122 which contains modified front and rear porous catalyst blocks 124 and 126, respectively. The front block 124 has a conical forward portion 128, while the rear block 126 has a complementary conical recess 130 at its rear end. The conical shape of the forward block 124 provides the same advantage as the conical forward portion of the particulate catalyst bed, namely, to provide quick heating so as to give a "kick off" to the catalyst reaction, and to cause turbulence of the entering gases. However, the heat capacity of the porous block type of catalyst is so low that this forward cone is not necessary, to give the desired initial "kick-off" to the catalyst reaction, and a flat forward surface on the front block as shown in FIG. 11 produces excellent results. If desired, where the front block has a flat forward surface, a "deflector" cone (not shown) may be employed forward or upstream of the entering gas inlet to provide the desired turbulence of the entering gases. As in the case of the particulate catalyst, the complementary rear conical recess 130 causes the catalyst bed depth to be uniform across its entire cross-sectional area. Although the ceramic disc or button has not been shown in FIG. 14, it may be employed in front of cone tip of block 124, if desired.

In FIGS. 15–22, inclusive, I have illustrated a slip-clutch drive air pump which I have found suitable for providing the required amount of air for my system under idling, low speed and high speed driving conditions. The details of construction of the air pump 16 shown in FIGS. 15–22, inclusive, do not form a part of my present invention, and it is to be understood that other types of variable drive means may be employed in connection with my system for providing only a moderate increase in the air supply between idle engine speed and highway engine speed.

The pump 16 includes a base member 132 upon which a pair of end plates 134 and 136 are mounted by means of bolts 137 or by other suitable means. A cylindrical pump case 138 is supported between end plates 134 and 136 by screws 140 to provide a sealed pumping chamber therein.

Pump inlet ports 142 are provided in end plates 134 and 136 adjacent to pump case 138, and receive air through respective inlet passages 144. Suitable air filters and air silencers 146 are disposed in the inlet passages 144, and passages 144 open to the atmosphere through openings 148 in the base member 132 or horizontally through openings in end plates 134 and 136.

Air outlet port 150 is provided through end plate 136, and communicates with the air conduit 18.

It will be noted that by providing my inlet ports 142 and outlet port 150 in the end walls rather than in the cylindrical pump case as is the usual procedure, I greatly reduce frictional wear on the ports, and on the pumping vanes, as the ports are not in the area of centrifugally forced engagement of the vanes against the pump case.

Pump shaft 152 is rotatably mounted in sealed anti-friction bearings 154 which are supported in the respective end plates 134 and 136, and pump rotor 156 is keyed to shaft 152 within pump case 138 between end plates 134 and 136 so as to rotate with shaft 152. Pumping vanes 158 are radially slidably mounted in rotor 156 so as to be engaged in sliding contact with the inner wall of pump case 138, by centrifugal force.

The pump shaft 152 is driven through a circular clutch plate 160 that is mounted on a threaded spindle 162 on one end of pump shaft 152, plate 160 being held in position by nut 164.

Clutch plate 160 is disposed within a clutch housing 166 which is driven by the engine fan belt 22, housing 166 including a pulley portion 168 having an annular recess 170 therein for receiving the fan belt 22. Clutch housing portion 168 is rotatably mounted on an anti-friction bearing 172 which is supported on a fixed hub 174 extending outwardly from end plate 134 and which is retained on hub 174 by a suitable retaining ring. The pulley portion 168 is tapped in several locations near the periphery to accept screws which clamp and retain clutch housing 166 to pulley portion 168.

Clutch housing 166 also includes an intermediate housing member 176 and a housing cover member 178, cover member 178 preferably being finned for cooling purposes and including an axial cup or thimble portion 180 having a grease reservoir 182 therein. Upon rotation of the clutch housing 166, grease disposed therein frictionally engages the clutch plate 160 so as to rotate clutch plate 160 and pump shaft 152. A combination of a proper grease in clutch housing 166 and a clutch plate 160 of the particular construction shown in the drawings and hereinafter described in detail produces relatively low slippage between clutch housing 166 and clutch plate 160 at low speeds, and a large amount of slippage at high speeds, thus providing the desired air output for my apparatus.

The clutch plate 160 is provided with a plurality of circularly arranged openings 184 therethrough, preferably six in number, the openings 184 preferably being spaced at equal radial distances from the center of clutch plate 160. A channel recess 186 extends from each opening 184 to the periphery of clutch plate 160 on one side of clutch plate 160, the recesses 186 extending to a depth of approximately one-third the thickness of the clutch plate. Similar channel recesses 188 on the other side of clutch plate 160 extend from the respective openings 184 to the periphery of the clutch plate. The channels 186 from each opening 184 will overlap the channel 188 from an adjacent opening 184, but will not break-out into each other since the respective depth of each is only one-third the total thickness of clutch plate 160. A relatively small clearance exists on both sides of clutch plate 160, and a larger clearance exists on the outer edge between clutch plate 160 and clutch housing 166. Grease within clutch housing 166 is then pumped or circulated by clutch plate 160 through the channels 186 and 188, utilizing the larger clearance between the outer edge of clutch plate 160 and clutch housing 166 as a reservoir for the grease in transit, limiting the tendency to increase frictional engagement at this point during high speed operation.

A high temperature silicone grease has been found satisfactory for use in the clutch housing, providing an increase of from about 1½ to 2 cubic feet per minute to about 5 cubic feet per minute of pump air output for an engine speed range of from about 450 r.p.m. (idle speed) to about 2500 r.p.m. (highway speed). Variations in this relationship between pump air output and driven speed of the pump may be accomplished by varying the amount of side clearance of the clutch plate 160 in clutch housing 166, which is preferably within a range of from about 10 to about 50 thousandths of an inch, and by controlling the thickness or centipoise of the grease employed.

It is preferred to employ a type of grease which will have the characteristic of thixotrophy; that is, one which will function principally as a solid until a certain shear point is reached, and thereafter will function primarily as a liquid. Silica which is powdered to a fineness of less than one micron in particle size exercises this property when mixed with a suitable carrier liquid such as water or oil. Other materials which will perform in this manner are finely powdered "Santocel" produced by Monsanto Chemical Company and finely powdered "Kaolin" produced by Minerals and Chemicals Corporation. Finely powdered silica appears to be preferred as it does not attrite by grinding itself. Also very small concentrations of Guar, such as "Jaguar," a commercial gum resin, will promote thixotrophy, so that small quantities of such material may be employed.

I find it convenient to mount the interrupter points 96 on the outside of pump end plate 136, and to provide a multilobed cam member 192 on the end of pump shaft 152 which projects outwardly through end plate 136 for producing the vibratory motion required for the interrupter points 96. In practice it has been found that a single-lobed cam member will heat the coil abnormally at low speeds of car operation. By providing a three-lobed cam member 192, and by driving the pump 16 at twice the speed of the engine, a spark frequency of six per engine revolution is achieved, which is consistent with a six-cylinder engine distributor, thus preventing such abnormal coil heating and providing a good steady spark even at low or idle engine speeds.

The points 96 include a movable contact member 194 and a fixed contact member 196, the movable contact member 194 being spring biased against the cam member 192 to provide the desired interruption of the points.

The purpose of interrupter points 96 is to provide a means of interrupting the direct current to the primary winding of the conventional automotive ignition coil 92, enabling the coil to then step-up the primary voltage to a secondary voltage sufficient to fire the ignition spark plug 36 as previously described. A typical installation would find fixed contact member 196 electrically grounded to pump end plate 136, and movable contact member 194 insulated from end plate 136 and conected externally to the primary coil winding. A capacitor may be used "across" interrupter points 96 if desired, both for the elimination of metal transfer and for the more satisfactory operation of the ignition system previously described.

In FIG. 22 I have illustrated a mechanical regulating device for further limiting the pump output volume. This includes a bore 198 extending downwardly through pump end plate 136 from outlet port 150 to the edge of end plate 136, with another passage 200 connecting inlet port 142 with the bore 198 intermediate its ends. A plunger 202 is slidable within bore 198, plunger 202 being attached to one end of a coil spring 204 positioned within bore 198 below plunger 202. The lower end of spring 204 is connected to an adjusting screw 206 which is threadedly engaged in the lower end of bore 198, extending out of bore 198 to permit adjustment thereof. A lock nut 208 may be provided on the exposed portion of adjusting screw 206.

In operation, when the engine and pump speeds are relatively low so that the pressure at outlet port 150 is correspondingly low, the plunger 202 is biased upwardly by spring 204 to a position in bore 198 wherein plunger 202 seals off passage 200, so that the entire air output of the pump will be provided to the exhaust stream. When the engine and pump speeds are increased, the back pressure at the pump outlet port 150 increases due to the increased pressure in the exhaust system, thus urging plunger 202 downwardly against the force of spring 204. When the engine and pump speeds increase sufficiently to raise the pressure at outlet port 150 beyond a predetermined level, the plunger 202 will move downwardly a sufficient amount to permit the excess air output of the pump to be by-passed through bore 198 and passage 200 to inlet port 142. The amount of this recirculation of air from the outlet port back to the inlet port may be adjusted by shifting the position of adjusting screw 206, thereby controlling the output volume of the pump which goes to the exhaust system to approximately the desired amount (such as 2 cubic feet per minute for a 235 cubic inch displacement engine), even when the engine is operating at high speeds.

The regulator shown in FIG. 22 is merely one suitable device for controlling the pump output volume, and it will be appreciated that other means may be employed to accomplish this purpose. For example, the pressure relief valve may merely be vented to the atmosphere instead of recirculating the excess air output back to the inlet port, although returning the air to the inlet port has the advantages of minimizing noise of the air relief and of providing pre-filtered air to the pump inlet. Another means for regulating the pump output volume would be to gradually close the inlet or suction ports of the pump in response to output pressure to "starve" the input of air.

By thus providing a combination of both the slip-clutch and output pressure regulating means, at relatively low engine speeds, the pump can run at moderate speeds giving full output to the exhaust system, but as the speed increases and the back pressure likewise increases, then although the moderately higher pump speeds permitted by the slip-clutch will cause more air to be pumped, this excess will be dissipated by the regulator, thus maintaining close to the desired air throughput level.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claim.

What I claim is:

Apparatus for removing impurities from an internal combustion engine exhaust system which comprises: an exhaust conduit, air pumping means connected to and communicating with the inside of said exhaust conduit to provide a mixture of air and exhaust ingredients, said air pumping means including a slip clutch the operation of which determines the volume of air introduced into said exhaust conduit, said air pumping means and said slip clutch being operable by said engine with an increase in speed of said engine increasing the slippage of said slip clutch, and decreasing engine speed effecting a decrease in slippage of said slip clutch, producing a ratio of air to exhaust ingredients diminishing with an increase in slippage of said slip clutch and increasing with decreasing slippage of said slip clutch, direct ignition means in said exhaust conduit downstream of said air pumping means for igniting exhaust ingredients not previously oxidized; and catalytic oxidizing means including a catalyst bed, the catalytic means being connected to said exhaust conduit downstream of said direct ignition means for oxidizing exhaust ingredients not previously completely oxidized.

References Cited in the file of this patent

UNITED STATES PATENTS

| | | |
|---|---|---|
| 1,843,999 | White | Feb. 9, 1932 |
| 1,858,637 | McDonald | May 17, 1932 |

(Other references on following page)

UNITED STATES PATENTS

| | | |
|---|---|---|
| 2,031,475 | Frazer | Feb. 18, 1936 |
| 2,038,567 | Ittner | Apr. 28, 1936 |
| 2,071,119 | Harger | Feb. 16, 1937 |
| 2,080,854 | Rohde | May 18, 1937 |
| 2,106,910 | Finn | Feb. 1, 1938 |
| 2,155,481 | Fenn | Apr. 25, 1939 |
| 2,678,031 | Spase et al. | May 11, 1954 |
| 2,831,993 | Lentz | Apr. 22, 1958 |
| 2,836,756 | Smits | May 27, 1958 |
| 2,937,490 | Calvert | May 24, 1960 |
| 2,953,898 | Cornelius | Sept. 27, 1960 |